United States Patent [19]

Takayama

[11] Patent Number: 5,201,677
[45] Date of Patent: Apr. 13, 1993

[54] CAR PLUG

[75] Inventor: Hisao Takayama, Tokyo, Japan

[73] Assignee: Shinwa Electric Co., Ltd., Tokyo, Japan

[21] Appl. No.: 907,691

[22] Filed: Jul. 2, 1992

[30] Foreign Application Priority Data

Jan. 10, 1992 [EP] European Pat. Off. ............ 92300255

[51] Int. Cl.$^5$ .............................................. H01R 17/18
[52] U.S. Cl. ..................................... 439/668; 439/622; 439/638
[58] Field of Search ................. 439/668, 669, 620–622, 439/638–640, 34, 825, 826, 675

[56] References Cited

U.S. PATENT DOCUMENTS

| | | | |
|---|---|---|---|
| 3,865,463 | 2/1975 | Busch | 439/668 |
| 4,322,122 | 3/1982 | Schwartz et al. | 439/668 |
| 4,988,315 | 1/1991 | Wharton | 439/668 |

FOREIGN PATENT DOCUMENTS 57580 3/1989 Japan ..................... 439/622

Primary Examiner—David L. Pirlot
Attorney, Agent, or Firm—Koda and Androlia

[57] ABSTRACT

A car plug connectable to an automobile cigarette lighter receptacle including a tip member having a tip terminal, a cylindrical member with the tip member screwed at one end, a base member attached to another end of the cylindrical member, a projection terminal having resilient contacts curved outwardly from the cylindrical member, an inner cylinder securely provided in the cylindrical member, a tubular fuse housed in the inner cylinder, a coil spring inserted between the tubular fuse and the tip terminal, and a metal terminal abutting against the base end of the tubular fuse and having a lead wire connecting portion. The car plug can fit in any size of cigarette lighter receptacles regardless of the diameter without coming off even under severe vibrations and in addition is easy to assemble.

1 Claim, 2 Drawing Sheets

CAR PLUG

BACKGROUND OF THE INVENTION

1. Field of the Invention

The present invention relates to a car plug which is inserted into a power supply insertion hole formed for a cigarette lighter in an automobile, to supply power to a car stereo, car TV set, air conditioner, various lighting fixtures, etc. In more detail, the present invention relates to a car plug which can be fitted firmly into any power supply insertion hole for a cigarette lighter different in diameter from maker to maker, without coming off even exposed to vibration during driving, etc., and in addition is easy to assemble.

2. Prior Art

In recent years, in the car society, the demand for car plugs of this kind is growing, but conventional car plugs have mostly one or two blades protruded from each body as the protrusion terminal.

However, the inner diameter of the power supply insertion hole formed for a cigarette lighter in an automobile is different from maker to maker of each country, and cars produced in Japan usually use small inner diameters, while those produced in Western countries use large inner diameters. If a car plug with two blades designed and prepared to fit a power supply insertion hole with a small inner diameter formed for a cigarette lighter as in a Japanese car is used in a power supply insertion hole with a large inner diameter formed for a cigarette lighter as in a Western car, it is low in holding capability and stability since it is in resilient contact with the hole only in two directions. So, it frequently occurs that the car plug connected with various apparatuses is loosened to cause contact failure and comes off due to the vibration of driving, and the driver must re-insert it often during driving very dangerously.

In such a case, a match or toothpick, etc., is inserted into the clearance between the power supply insertion hole for a cigarette lighter and the car plug, for preventing it from coming off, and this poses a problem of safety in view of leak and short circuit.

SUMMARY OF THE INVENTION

The inventors studied intensively to overcome the above disadvantage. The object of the present invention is to provide a car plug which can be firmly fitted into the power supply insertion hole formed for a cigarette lighter in an automobile, in other words, which can keep stable electric connection over a long time irrespective of the size of the power supply insertion hole and have a space to allow the incorporation of a small part like a board of noise filter into the base member, and is, in addition, easy to assemble.

The present invention is composed of a tip terminal, tip member, cylindrical member, protrusion terminal, base member, inner cylinder, tubular fuse, coil spring and metal terminal, and is characterized in that the cylindrical member is a double cylinder consisting of the inner cylinder and an outer cylinder connected by a connecting portion and with an annular clearance between them; that a male thread portion is formed in the connecting portion, that at least three slits are formed in the male thread portion and the outer cylinder; that the protrusion terminal has a washer-shaped base and strips extending from the washer-shaped base; and that each of the strips has an insert portion, board portion and resilient contact portion; wherein the insert portions are inserted into the annular clearance, the washer-like base, being fitted to be flush with the tip surface of the connecting portion, the male thread portion, being engaged with a female thread portion, and the resilient contact portions, being protruded through the slits at least in three directions.

DETAILED DESCRIPTION OF THE INVENTION

The car plug of the present invention to achieve the above object is described below in reference to the drawings showing an example.

Figure 1:
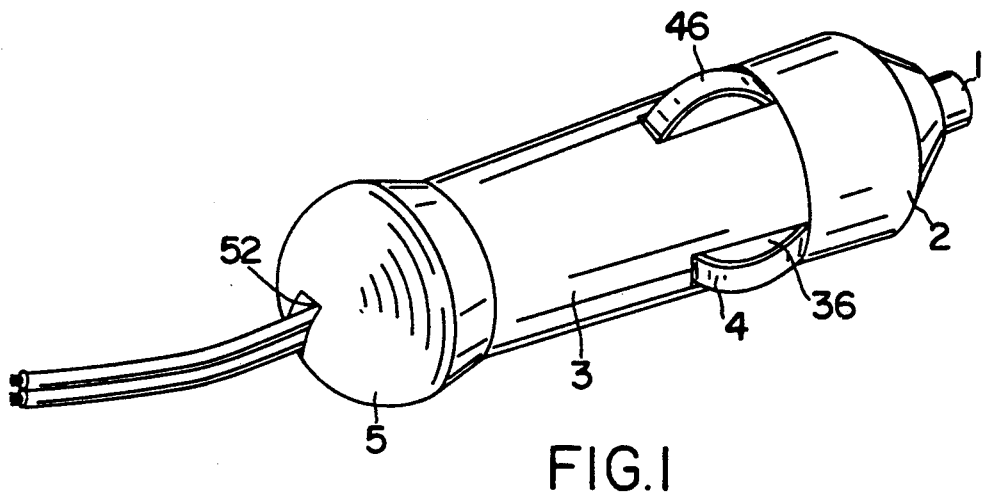
FIG. 1 is an entire perspective view showing a car plug as an example of the present invention.
Figure 2:
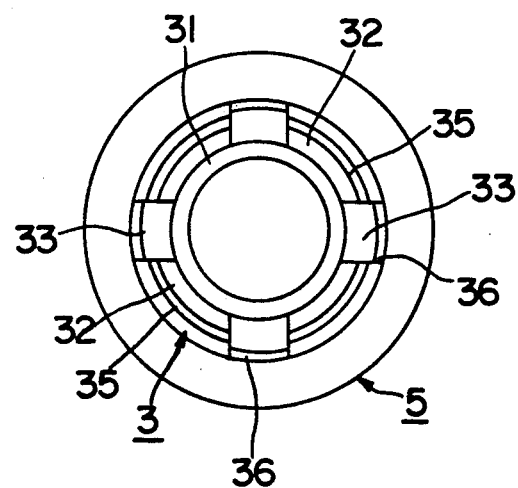
FIG. 2 is a plan view showing a cylindrical member.
Figure 3:
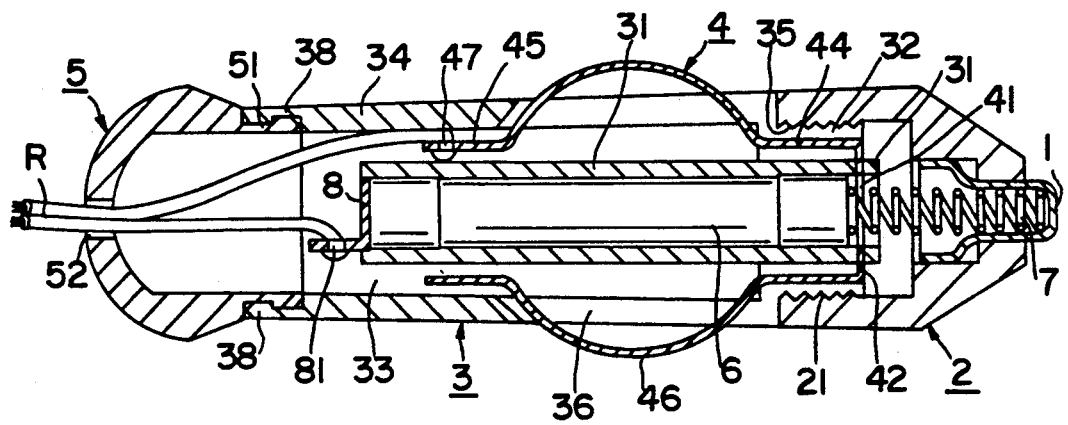
FIG. 3 is a vertical sectional view on the central line.
Figure 4:
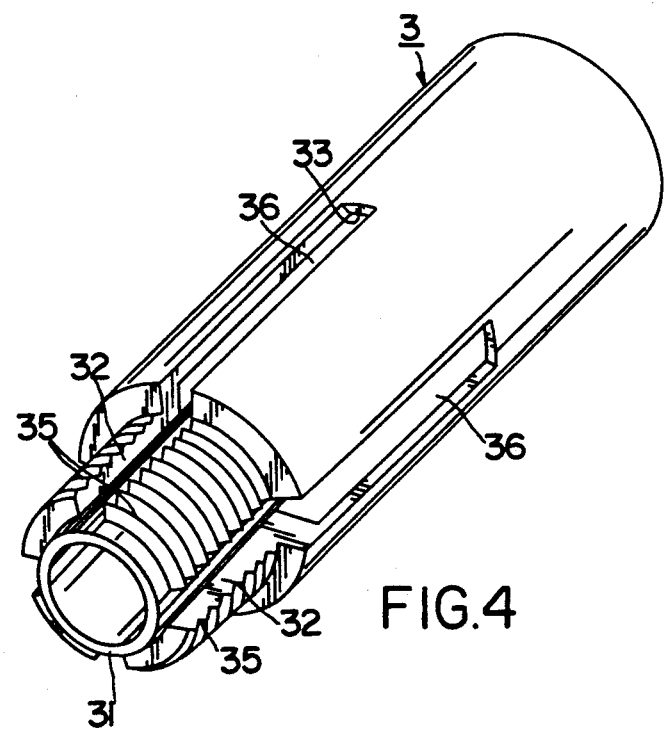
FIG. 4 is a perspective view showing a cylindrical member.

FIG. 1 is an entire perspective view showing a car plug as an example of the present invention. FIG. 2 is a plan view showing a cylindrical member. FIG. 3 is a vertical sectional view on the central line. FIG. 4 is a perspective view showing a cylindrical member.

The present invention relates to a car plug which is inserted into the power supply insertion hole formed for a cigarette lighter in an automobile, to supply the power to a car stereo, car TV set, air conditioner, various lighting fixtures, etc. In more detail, the present invention relates to a car plug which can be fitted firmly into any power supply insertion hole formed for a cigarette lighter which is different in diameter from maker to maker, without coming off even exposed to vibration during driving, etc., and in addition is easy to assemble. The present invention is a car plug, which is composed of a tip terminal 1, a tip member 2 with the terminal 1 protruding toward the tip and with a female thread portion 21 inside on the base side, a cylindrical member 3 with the tip member 2 threadably attached at its tip, a projection terminal 4 projected outwardly from the cylindrical member 3, a base member 5 attached at the base end of the cylindrical member 3, a base member 5 attached at the base end of the cylindrical member 3, an inner cylinder 31 solidly provided inside the cylindrical member 3, a tubular fuse 6 housed in the inner cylinder 31, a coil spring 7 provided between the tubular fuse 6 and the tip terminal 1, and a metal terminal 8 abutting against the base end of the tubular fuse 6 and with a lead wire connecting portion 81, comprising the cylindrical member 3, being formed as a double cylinder consisting of the inner cylinder 31 and an outer cylinder 34 connected by an annular connecting portion 32 at their tips with an annular clearance 33 formed toward the base end between them; a male thread portion 35, being formed in the connecting portion 32, to be threadedly engaged with the female thread portion 21 of the tip member 2; at least three slits 36, being formed at equal intervals in the male thread portion 35 and the outer cylinder 34 in their axial direction at positions in the radial direction from the axial center; the projection terminal 4, having a central circular hole 41 with the tip of the inner cylinder 31 of the cylindrical member 3 inserted in the hole 41 and a washer-shaped base 42 to be flush with the tip surface of the connecting portion 32, and having strips 43 as many as the slits 36, extending from the circumferential edge of the washer-shaped base 42 through positions corresponding to the slits 36; and each of the respective strips 43, being folded at its end portions almost at right angles in the same directions to form a board portion 44 to be inserted into the corresponding slit 36 of the connecting portion 32 and to form an insert portion 45 to be inserted through the annular clearance 33, with a resilient contact portion 46 curved in a circumferential direction to be protruded outside of the outer cylinder 34, as an intermediate portion to connect the board portion 44 and the insert portion 45, wherein the insert portions 45 of the protrusion terminal 4 are inserted through the annular clearance 33 of the cylindrical member 3; the washer-like base 42 of the protrusion terminal 4 is fitted to be flush with the tip surface of the connecting portion 32; the female thread portion 21 of the tip member 2 is engaged with the male thread portion 35 of the cylindrical member 3; and the resilient contact portions 46 of the protrusion terminal 4 are protruded at least in three directions from the slits 36 of the outer cylinder 34 of the cylindrical member 3.

The present invention is a car plug which is inserted into the power supply insertion hole formed for a cigarette lighter in an automobile, to supply the power to a car stereo, car TV, air conditioner, various lighting fixtures, etc., and which does not come off even when exposed to vibration during driving, etc., even if it is fitted into a power supply insertion hole smaller in inner diameter as in a Japanese car or large in inner diameter as in a Western car. In addition, the car plug allows a small part such as a board to be incorporated and is easy to assemble.

The tip terminal 1 is made of a metal and formed like a cap with a U-shaped longitudinal section, and its tip abuts against a power terminal provided at the central bottom of the power supply insertion hole formed for a cigarette lighter in an automobile, for electric connection, while its base end is expanded like a flange, to be engaged with the opening on the tip side of the tip member 2 described later. In the opening, the coil spring 7 is set between the tip terminal 1 and the tubular fuse 6, for resiliently press them.

The tip member 2 is made of a thermally flexible resin and formed like a hollow truncated cone, with an opening formed on the tip side to be engaged with the flange-like expanded portion of the tip terminal 1. It is protruded at the tip and has the female thread portion 21 formed inside on the base side, to be engaged with the male thread portion 35 of the cylindrical member 3 described later.

The cylindrical member 3 is a double cylinder consisting of the inner cylinder 31 and the outer cylinder 34 connected by the annular connecting portion 32 on the tip side. That is, the inner cylinder 31 and the outer cylinder 34 connected by the annular connecting portion 32 with the annular clearance 33, and the tip surface of the annular connecting portion 32 is flush with the washer-like base 42 of the protrusion terminal 4, while the tip of the inner cylinder 31 protrudes by a small distance. The connecting portion 32 has the male thread portion 35 formed to be engaged with the female thread portion 21 of the tip member 2, and at least three slits 36 are formed at equal intervals in the male thread portion 35 and the outer cylinder 34 in their axial direction at positions in the radial direction from the axial center. In the drawings showing an example, four slits 36 are formed. The slits 36 are long enough to allow the insert portions 45 of the protrusion terminal 4 to be inserted again into the annular clearance 33. At the base end of the cylindrical portion 3, an annular protrusion 37 is formed and engaged with an annular recess 51 formed in the base member 5 described later.

The protrusion terminal 4 is made of a properly resilient metal and has the almost annular washer-like base 42 containing the central circular hole 41 which has the tip of the inner cylinder 31 protruding near the connecting portion 32 of the cylindrical member 3 inserted in the hole 41. From the circumferential edge of the washer-like base 42, the strips 43 as many as at least three slits 36 formed in the cylindrical member 3 extend through the slits 36. Each of the strips 43 is folded almost at right angles in the same directions, to form the board portion 44 to be inserted into the corresponding slit 36 of the connecting portion 32 of the cylindrical member 3 and to form the insert portion 45 to be inserted through the annular clearance 33 from the corresponding slit of the cylindrical member 3, and the resilient contact portion 46 curved in the circumferential direction to be protruded outward from the outer cylinder 34 is formed as an intermediate portion to connect the board portion 44 and the insert portion 45. The resilient contact portions 46 are curved and protruded in the central regions to contact the power terminal provided on the inner wall of the power supply insertion hole for a cigarette lighter, for an electric connection. Furthermore, one of the strips 43 has a wire connecting portion 47 to be connected with either of the lead wires R at the tip of the cord connected with the apparatuses mounted in the car.

The base member 5 has a lead wire through hole 51 at the base end through which the lead wires R at the tip of the cord connected to the apparatuses mounted in the car is inserted, and has the annular recess 51 formed to be fitted to the base end of the cylindrical member 3, having a hollow space enough to incorporate a small part such as a noise filter.

The tubular fuse 6 is installed detachably between the metal terminal 8 fitted in the inner cylinder 31 of the cylindrical member 3 and the coil spring 7 inserted in the tip terminal 1, and the metal terminal 8 is fitted in the inner cylinder 31 and has a wire connecting portion 81 at one end to be connected with the other lead wire R of the cord from the apparatuses mounted in the car.

In the car plug of the present invention, at first, the insert portions 45 of the strips 43 of the protrusion terminal 4 are inserted into the at least three slits 36 formed in the cylindrical member 3, and inserted through the annular clearance 33 of the cylindrical member 3, and the tip of the inner cylinder 31 of the cylindrical member 3 is slightly inserted into the central circular hole 41 of the almost annular washer-like base 42. The board portions 44 of the protrusion terminal 4 are inserted into the slits 36 on the connecting portion 32 of the cylindrical member 3, and the resilient contact portions 46 of the protrusion terminal 4 are protruded from the slits 36 of the outer cylinder 34 of the cylindrical member 3.

The tubular fuse 6 is inserted into the inner cylinder 31 of the cylindrical member 3, and the washer-like base 42 of the protrusion terminal 4 is fitted to be flush with the tip surface of the connecting portion 32. The female thread portion 21 of the tip member 2 is engaged with the male thread portion 35 of the cylindrical member 3, and the resilient contact portions 46 of the protrusion terminal 4 are protruded in the circumferential direction of the outer cylinder 34 of the cylindrical member 3 at least in three directions at equal intervals at positions in the radial direction from the central axis.

Then, the annular recess 51 formed on the base member 5 is fitted to the annular protrusion 37 of the cylindrical member 3. The lead wires R protruded from the end of the cord from the apparatuses mounted in the car are inserted through the lead wire through port 52 formed in the base member 5, and connected to the wire connecting portion 47 of the protrusion terminal 4 and to the wire connecting portion 81 of the metal terminal 8 by such a means as fusion welding or soldering, etc.

If the car plug of the present invention assembled as described above is inserted into the power supply insertion hole formed for a cigarette lighter in an automobile, the power terminal provided in the inner wall of the power supply insertion hole presses the protrusion terminal 4 in the central direction, to constitute an electric circuit. The protrusion terminal 4 is squeezed and firmly fixed by the resiliency acting in a circumferential direction, and the electric circuit is established when the tip of the tip terminal 1 is brought into reliable contact with the power terminal provided at the central bottom of the power supply insertion hole by the resiliency of the coil spring 7 by forcing the car plug into the power terminal provided at the central bottom of the power supply insertion hole.

The car plug of the present invention is composed as described above. One car plug can be inserted and fitted in the power supply insertion hole formed for a cigarette lighter in any automobile, that is, can hold electric connection stably over a long time irrespective of the size of the power supply insertion hole for a cigarette lighter. Furthermore, it can be easily assembled and can have a small board such as noise filter assembled in the base member. It is an epochal general purpose invention excellent also in function.

What is claimed is:

1. A car plug, which is composed of a tip terminal, a tip member with said tip terminal protruding toward the tip member and with a female thread portion interiorly on a base side, a cylindrical member with said tip member threadably attached at its tip, a projection terminal projected outwardly from said cylindrical member, a base member attached at a base end of said cylindrical member, an inner cylinder provided inside said cylindrical member, a tubular fuse housed in said inner cylinder, a coil spring provided between said tubular fuse and said tip terminal, and a metal terminal abutting against the base end of said tubular fuse and with a lead wire connecting portion, comprising said cylindrical member, being formed as a double cylinder consisting of said inner cylinder and an outer cylinder connected by an annular connecting portion with an annular clearance formed toward the base end; a male thread portion, being formed in said connecting portion, to be threadably engaged with the female thread portion of said tip member; at least three slits, being formed at equal intervals in said male thread portion and said outer cylinder in an axial direction at positions in a radial direction from an axial center; said projection terminal, having a central circular hole with the tip of said inner cylinder of said cylindrical member inserted in the hole and a washer-shaped base to be flush with the tip surface of the connecting portion, and having strips as many as said slits, extending from a circumferential edge of said washer-shaped base at positions corresponding to the slits; and each of said respective strips, being folded at its end portions almost at right angles in the same direction to form a board portion to be inserted into the corresponding slit of the connecting portion and to form an insert portion to be inserted through said annular clearance, with a resilient contact portion curved in a circumferential direction to be protruded outside of said outer cylinder, as an intermediate portion to connect said board portion and said insert portion, wherein said insert portion of the projection terminal are inserted through said annular clearance of the cylindrical member; the female thread portion of the tip member is engaged with the male thread portion of the cylindrical member; and the resilient contact portions of the projection terminal are protruded at least in three directions from the slits of the outer cylinder of the cylindrical member.

* * * * *